US012236205B2

(12) United States Patent
Li et al.

(10) Patent No.: US 12,236,205 B2
(45) Date of Patent: Feb. 25, 2025

(54) MULTILINGUAL MODEL TRAINING USING PARALLEL CORPORA, CROWDSOURCING, AND ACCURATE MONOLINGUAL MODELS

(71) Applicant: Microsoft Technology Licensing, LLC, Redmond, WA (US)

(72) Inventors: Ji Li, San Jose, CA (US); Amit Srivastava, San Jose, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/131,624

(22) Filed: Dec. 22, 2020

(65) Prior Publication Data

US 2022/0198157 A1 Jun. 23, 2022

(51) Int. Cl.
*G06F 40/58* (2020.01)
*G06F 40/169* (2020.01)
(Continued)

(52) U.S. Cl.
CPC ............ *G06F 40/58* (2020.01); *G06F 40/169* (2020.01); *G06F 40/279* (2020.01); *G06F 40/30* (2020.01);
(Continued)

(58) Field of Classification Search
CPC ........ G06F 40/58; G06F 40/279; G06F 40/45; G06F 40/169; G06F 40/30; G06N 20/00; G06N 3/08
See application file for complete search history.

(56) References Cited

U.S. PATENT DOCUMENTS 9,158,559 B2    10/2015  Simmons et al.
9,195,910 B2    11/2015  Garera et al.
(Continued)

FOREIGN PATENT DOCUMENTS

WO    2020220369 A1    11/2020

OTHER PUBLICATIONS

Pikuliak, Matúš, Marian Simko, and Maria Bielikova, "Cross-Lingual Learning for Text Processing: A Survey", Aug. 2020, Expert Systems with Applications, pp. 1-26. (Year: 2020).*
(Continued)

*Primary Examiner* — Daniel C Washburn
*Assistant Examiner* — James Boggs
(74) *Attorney, Agent, or Firm* — NovoTechIP International PLLC

(57) ABSTRACT

A data processing system for generating training data for a multilingual NLP model implements obtaining a corpus including first and second content items. The first content items are English-language textual content, and the second content items are translations of the first content items in one or more non-English target languages. The system further implements selecting a first content item from the first content items, generating a plurality of candidate labels for the first content item by analyzing the first content item with a plurality of first English-language NLP models, selecting a first label from the plurality of candidate labels, generating first training data by associating the first label with the first content item, generating second training data by associating the first label with a second content item of the second content items, and training a pretrained multilingual NLP model with the first training data and the second training data.

20 Claims, 7 Drawing Sheets

(51) Int. Cl.

| | |
|---|---|
| *G06F 40/279* | (2020.01) |
| *G06F 40/30* | (2020.01) |
| *G06F 40/45* | (2020.01) |
| *G06N 3/08* | (2023.01) |
| *G06N 20/00* | (2019.01) |

(52) U.S. Cl.
CPC ............... *G06F 40/45* (2020.01); *G06N 3/08* (2013.01); *G06N 20/00* (2019.01)

(56) References Cited

U.S. PATENT DOCUMENTS

| | | | | |
|---|---|---|---|---|
| 9,779,087 | B2* | 10/2017 | Das | G06F 40/45 |
| 10,033,808 | B2 | 7/2018 | Simmons et al. | |
| 10,460,036 | B2* | 10/2019 | Duong | G06N 3/045 |
| 10,872,204 | B2 | 12/2020 | Zhu et al. | |
| 11,082,369 | B1* | 8/2021 | Liu | G06N 3/04 |
| 11,663,219 | B1 | 5/2023 | Profirovic | |
| 11,803,883 | B2* | 10/2023 | Wu | G06Q 10/0633 |
| 11,875,131 | B2* | 1/2024 | Li | G06F 18/24 |
| 2006/0136223 | A1 | 6/2006 | Brun | |
| 2008/0306728 | A1 | 12/2008 | Kamatani et al. | |
| 2011/0191105 | A1 | 8/2011 | Spears | |
| 2015/0019200 | A1 | 1/2015 | Woodward et al. | |
| 2018/0107945 | A1 | 4/2018 | Gao et al. | |
| 2018/0314689 | A1 | 11/2018 | Wang et al. | |
| 2018/0356957 | A1 | 12/2018 | Desjardins | |
| 2019/0197484 | A1* | 6/2019 | Jamali | G06Q 10/1053 |
| 2019/0236146 | A1 | 8/2019 | Niekrasz | |
| 2020/0043495 | A1 | 2/2020 | Park et al. | |
| 2020/0125639 | A1 | 4/2020 | Doyle | |
| 2020/0125729 | A1 | 4/2020 | Priel | |
| 2020/0159871 | A1 | 5/2020 | Bowen | |
| 2020/0393915 | A1 | 12/2020 | Brendel et al. | |
| 2021/0264106 | A1 | 8/2021 | Li et al. | |
| 2021/0357599 | A1 | 11/2021 | Gupta et al. | |
| 2022/0075945 | A1* | 3/2022 | Zhang | G06F 40/295 |
| 2022/0188575 | A1* | 6/2022 | Zhu | G06F 40/30 |
| 2022/0366295 | A1 | 11/2022 | Lamba | |
| 2023/0129314 | A1 | 4/2023 | Li et al. | |
| 2023/0177281 | A1 | 6/2023 | Uday | |
| 2023/0274096 | A1 | 8/2023 | Bohra et al. | |

OTHER PUBLICATIONS

Sun, Zhiqing, Hongkun Yu, Xiaodan Song, Renjie Liu, Yiming Yang, and Denny Zhou, "MobileBERT: A Compact Task-Agnostic BERT for Resource-Limited Devices", Jul. 2020, Proceedings of the 58th Annual Meeting of the Association for Computational Linguistics, pp. 2158-2170. (Year: 2020).*

Bari, M. Saiful, Tasnim Mohiuddin, and Shafiq Joty, "Multimix: A Robust Data Augmentation Framework for Cross-Lingual NLP", Jun. 2020, arXiv preprint arXiv:2004.13240v2. (Year: 2020).*

Catal, Cagatay, and Mehmet Nangir, "A Sentiment Classification Model Based on Multiple Classifiers", Nov. 2016, Applied Soft Computing 50, pp. 135-141. (Year: 2016).*

Ellis, Joseph G., Brendan Jou, and Shih-Fu Chang, "Why We Watch the News: A Dataset for Exploring Sentiment in Broadcast Video News", Nov. 2014, Proceedings of the 16th International Conference on Multimodal Interaction, pp. 104-111. (Year: 2014).*

Chen, Yang, and Alan Ritter, "Model Selection for Cross-Lingual Transfer using a Learned Scoring Function", Oct. 2020, arXiv preprint arXiv:2010.06127, pp. 1-15. (Year: 2020).*

He, Keqing, Weiran Xu, and Yuanmeng Yan, "Multi-Level Cross-Lingual Transfer Learning With Language Shared and Specific Knowledge for Spoken Language Understanding", Feb. 2020, IEEE Access, vol. 8, pp. 29407-29416. (Year: 2020).*

Rahimi, Afshin, Yuan Li, and Trevor Cohn, "Massively Multilingual Transfer for NER", Jul. 2019, Proceedings of the 57th Annual Meeting of the Association for Computational Linguistics, pp. 151-164. (Year: 2019).*

Adams, Oliver, Adam Makarucha, Graham Neubig, Steven Bird, and Trevor Cohn, "Cross-Lingual Word Embeddings for Low-Resource Language Modeling", Apr. 2017, Proceedings of the 15th Conference of the European Chapter of the Association for Computational Linguistics: vol. 1, Long Papers, pp. 937-947. (Year: 2017).*

Valizadegan, Hamed, and Pang-Ning Tan, "Kernel Based Detection of Mislabeled Training Examples", Apr. 2007, Proceedings of the 2007 Society for Industrial and Applied Mathematics (SIAM) International Conference on Data Mining, pp. 309-319. (Year: 2007).*

Lample, et al., "MUSE: Multilingual Unsupervised and Supervised Embeddings", Retrieved from: https://github.com/facebookresearch/MUSE#ground-truth-bilingual-dictionaries, Retrieved on: Jan. 20, 2022, 9 Pages.

Laujan, et al., "Quickstart: Get started with Translator", Retrieved from: https://docs.microsoft.com/en-us/azure/cognitive-services/Translator/quickstart-translator?tabs=csharp, Jan. 29, 2022, 18 Pages.

Gupta, et al., "Compression of Deep Learning Models for Text: A Survey", In Journal of ACM Transactions on Knowledge Discovery from Data, vol. 16, Issue 4, Jan. 8, 2022, 55 Pages.

Hosseini, et al., "Crowdcloud: a Crowdsourced System for Cloud Infrastructure", In Journal of Cluster Computing vol. 22, Issue 2, Aug. 30, 2018, pp. 455-470.

Liu, et al., "Upgrading the Newsroom: An Automated Image Selection System for News Articles", In Repository of arXiv:2004.11449v1, Apr. 23, 2020, 28 Pages.

"International Search Report and Written Opinion Issued in PCT Application No. PCT/US21/060909", Mailed Date: Mar. 10, 2022, 14 Pages.

Yarowsky, et al., "Inducing Multilingual Text Analysis Tools via Robust Projection across Aligned Corpora", In Proceedings of The First International Conference on Human Language Technology Research, Mar. 18, 2001, 8 Pages.

Riloff, et al., "Inducing Information Extraction Systems for New Languages via Cross-Language Projection", In Proceedings of 19th International Conference on Computational Linguistics, Aug. 24, 2002, 7 Pages.

Pikuliak, et al., "Cross-lingual learning for text processing: A survey", In Journal of Expert Systems with Applications, vol. 165, Mar. 1, 2021, 26 Pages.

U.S. Appl. No. 17/510,850, filed Oct. 26, 2021.
U.S. Appl. No. 17/681,250, filed Feb. 25, 2022.

Husain, et al., "A Survey of Offensive Language Detection for the Arabic Language", In Journal of ACM Transactions on Asian and Low-Resource Language Information Processing, vol. 20, Issue 1, Mar. 9, 2021, 44 Pages.

"International Search Report and Written Opinion Issued in PCT Application No. PCT/US22/039648", Mailed Date: Oct. 26, 2022, 11 Pages.

"Non Final Office Action Issued In U.S. Appl. No. 17/510,850", Mailed Date: Nov. 1, 2023, 29 Pages.

Bentaallah, et al., "The Use of Word Nets for Multilingual Text Categorization: A Comparative Study", Published in ICWIT, Jan. 1, 2012, pp. 121-128.

El-Alami, et al., "A Multilingual Offensive Language Detection Method based on Transfer Learning from Transformer Fine-tuning Model", In Journal of King Saud University-Computer and Information Sciences, Jul. 1, 2021, pp. 6048-6056.

"International Search Report and Written Opinion Issued in PCT Application No. PCT/US22/050994", Mailed Date: Mar. 27, 2023, 11 Pages.

Prajapati, et al., "Automated Text Categorization with Machine Learning and its Application in Multilingual Text Categorization", In Proceeding of National Conference on Advance Computing, Jan. 1, 2009, pp. 204-209.

Final Office Action mailed on Feb. 28, 2024, in U.S. Appl. No. 17/510,850, 28 Pages.

Notice of Allowance mailed on May 22, 2024, in U.S. Appl. No. 17/510,850 11 pages.

Non-Final Office Action Issued in U.S. Appl. No. 17/681,250, mailed on Aug. 7, 2024, 20 pages.

(56) References Cited

OTHER PUBLICATIONS

Final Office Action mailed on Dec. 18, 2024, in U.S. Appl. No. 17/681,250 20 pages.

* cited by examiner

MULTILINGUAL MODEL TRAINING USING PARALLEL CORPORA, CROWDSOURCING, AND ACCURATE MONOLINGUAL MODELS

BACKGROUND

Natural language processing (NLP) models have been developed that provide very accurate processing of English language textual content. Applications may use these NLP models to extract contextual information from the English language textual content and use this contextual information to provide various services to the users of the application. However, applications may have a global userbase that speaks and creates content in numerous other languages. Thus, multilingual support is critical to providing these services to global customers who do not use the English language in the content that they create.

One current approach for providing multilingual support is to use machine translation to translate a user's textual input from the language in which the content was created to English language textual content. The English language textual content may then be processed by NLP models to obtain contextual information that may be used by the application to provide services to the user. This approach may be accurate, but the latency associated with this approach is often too high to be acceptable for most uses.

Another current approach for providing multilingual support is to use a bilingual dictionary to map some foreign tokens to English and sending the English language output from the mapping to a monolingual model. Using such a mapping overcomes the latency issues of the previously described approach but introduces other significant shortcomings. This approach has low coverage of foreign language inputs, as only words that are included in the bilingual dictionary are support. Another significant shortcoming is that this approach does not perform well for sentences. Important contextual information regarding the usage of the words within the sentences may be lost because the bilingual dictionary translates on a word-by-word basis. Furthermore, this approach can introduce significant memory overhead as a bilingual dictionary is needed for each language being supported.

The current approaches discussed above involve translating non-English language textual input to an English language input to be processed by the natural language processing model. Multilingual models trained to receive non-English languages as an input would eliminate the need to first translate the non-English language textual input. However, multilingual models need training data in the languages to be supported, and the amount of non-English training data is quite limited. Furthermore, creating additional labeled non-English training data is an extensive and labor-intensive process requiring human users to translate English language text to the corresponding non-English language text. Training data could be created by using machine translation to translate English language training data to one or more non-English languages, and the original labels from the English language training data may be inherited by the non-English language training data. But errors in machine translation models in translating the English language content to the non-English language content are carried over to the training data. As a result, multilingual models training using this approach may provide incorrect inferences from non-English language inputs.

For at least these reasons, the current approaches to providing multilingual support have numerous shortcomings that significantly impact the effectiveness of these approaches. Hence, there is a need for improved systems and methods that provide a technical solution for solving the technical problem of training multilingual natural language processing models.

SUMMARY

An example data processing system according to the disclosure may include a processor and a computer-readable medium storing executable instructions. The instructions when executed cause the processor to perform operations including obtaining a corpus comprising a plurality of first content items and a plurality of second content items, wherein the first content items comprise English-language textual content, and the plurality of second content items comprise translations of the first content items in one or more non-English target languages: selecting a first content item from the plurality of first content items: generating a plurality of candidate labels for the first content item by analyzing the first content item with a plurality of first English-language natural language processing (NLP) models: determining whether a majority of the candidate labels are for the first content item are consistent: selecting a first candidate label from the plurality of candidate labels responsive to the majority of the candidate labels being consistent: generating first training data for fine tuning a multilingual NLP model by associating the first candidate label with the first content item: generating second training data for fine tuning the multilingual NLP model by associating the first candidate label with a second content item of the plurality of second content items; and training a pretrained multilingual NLP model with the first training data and the second training data to fine tune the training of the NLP model with respect to English and a respective non-English target language associated with the second content item.

An example method implemented in a data processing system for generating training data for a multilingual natural language processing model includes obtaining a corpus comprising a plurality of first content items and a plurality of second content items, wherein the first content items comprise English-language textual content, and the plurality of second content items comprise translations of the first content items in one or more non-English target languages: selecting a first content item from the plurality of first content items: generating a plurality of candidate labels for the first content item by analyzing the first content item with a plurality of first English-language natural language processing (NLP) models: determining whether a majority of the candidate labels are for the first content item are consistent: selecting a first candidate label from the plurality of candidate labels responsive to the majority of the candidate labels being consistent: generating first training data for fine tuning the multilingual NLP model by associating the first candidate label with the first content item: generating second training data for fine tuning the multilingual NLP model by associating the first candidate label with a second content item of the plurality of second content items; and training a pretrained multilingual NLP model with the first training data and the second training data to fine tune the training of the NLP model with respect to English and a respective non-English target language associated with the second content item.

An example computer-readable storage medium on which are stored instructions. The instructions when executed cause a processor of a programmable device to perform functions of obtaining a corpus comprising a plurality of first content items and a plurality of second content items, wherein the first content items comprise English-language textual content, and the plurality of second content items comprise translations of the first content items in one or more non-English target languages: selecting a first content item from the plurality of first content items: generating a plurality of candidate labels for the first content item by analyzing the first content item with a plurality of first English-language natural language processing (NLP) models: determining whether a majority of the candidate labels are for the first content item are consistent: selecting a first candidate label from the plurality of candidate labels responsive to the majority of the candidate labels being consistent: generating first training data for fine tuning a multilingual NLP model by associating the first candidate label with the first content item: generating second training data for fine tuning the multilingual NLP model by associating the first candidate label with a second content item of the plurality of second content items; and training a pretrained multilingual NLP model with the first training data and the second training data to fine tune the training of the NLP model with respect to English and a respective non-English target language associated with the second content item.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The drawing figures depict one or more implementations in accord with the present teachings, by way of example only, not by way of limitation. In the figures, like reference numerals refer to the same or similar elements. Furthermore, it should be understood that the drawings are not necessarily to scale.

DETAILED DESCRIPTION

In the following detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings.

Figure 1:
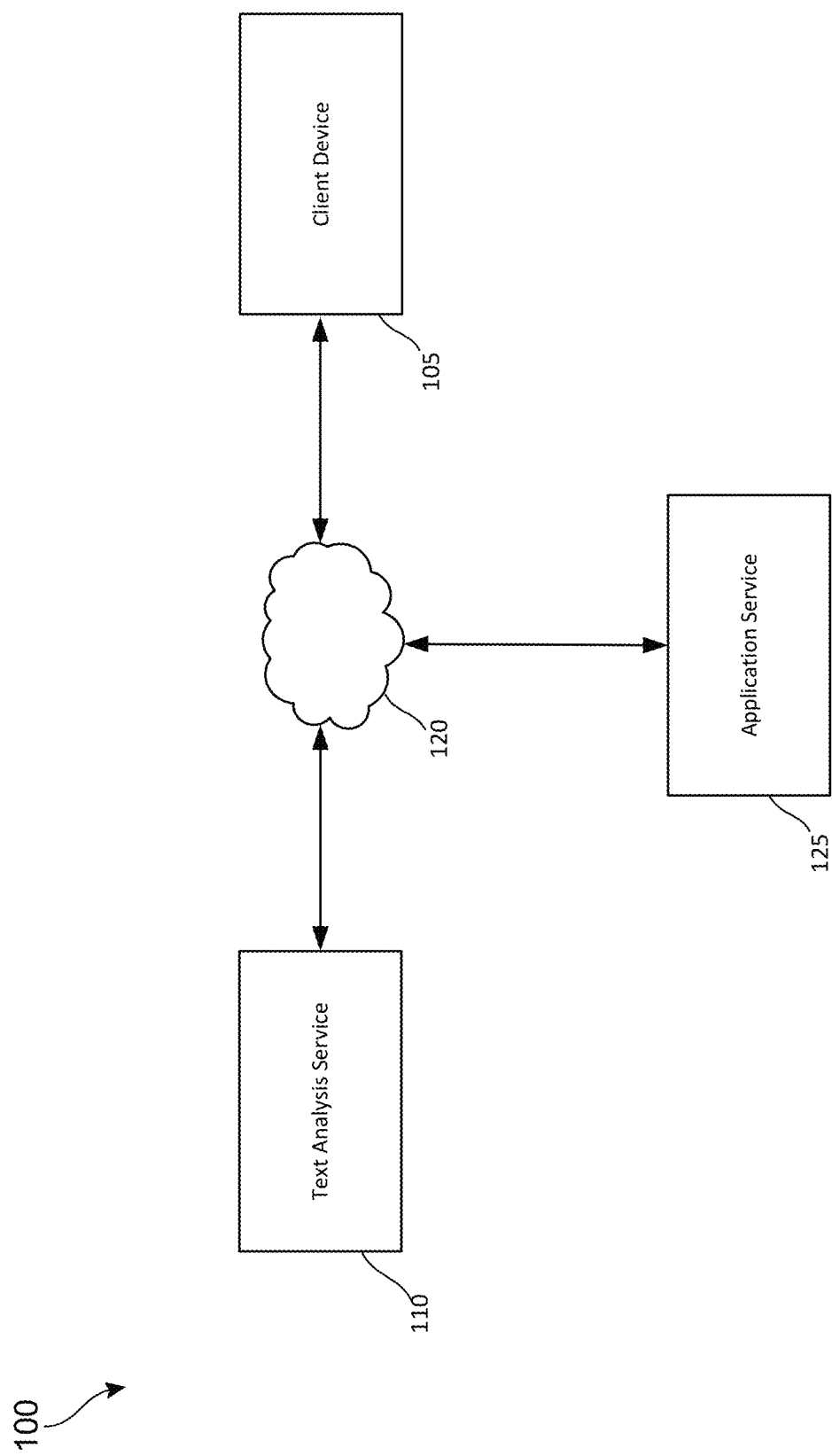
FIG. 1 is a diagram showing an example computing environment in which the techniques disclosed herein may be implemented.

Techniques for generating training data for training multilingual natural language processing (NLP) models presented herein provide a technical solution for solving the technical problem of obtaining sufficient training data for fine tuning multilingual NLP models without requiring a large amount of expensive and labor-intensive human-labeled non-English language training data. The techniques provided herein provide a technical solution to the technical problem of obtaining the non-English language training data for training the multilingual NLP models by (1) selecting textual content from a multilingual corpus of textual content. (2) selecting an English-language sentence or phrase from the multilingual corpus that is associated with at least one non-English-language translation of the sentence or phrase. (3) generating candidate labels for the English-language sentence or phrase using English-language NLP models, (4) selecting a candidate label from the candidate labels and associating the selected label with the English-language sentence to generate first training data for fine-tuning the multilingual NLP model, and (5) using the labels generated using the English-language sentence or phrase to label the at least one non-English-language translation of the sentence or phrase to create second training data for the at least one other language. A technical benefit of theses techniques is that the process for generating the training data for the one or more other languages may be automated once the training data being produced is shown to be tested. These and other technical benefits of the techniques disclosed herein will be evident from the discussion of the example implementations that follow:

FIG. 1 is a diagram showing an example computing environment 100 in which the techniques disclosed herein for training multilingual NLP models may be implemented. The computing environment 100 may include a text analysis service 110. The example computing environment 100 may also include a client device 105 and an application service 125. The client device 105 may communicate with the text analysis service 110 and/or the application service 125 via the network 120.

In the example shown in FIG. 1, the text analysis service 110 is implemented as a cloud-based service or set of services. The text analysis service 110 may be configured to receive a request to analyze textual content from the client device 105 and/or the application service 125. The text analysis service 110 may include one or more NLP models that are configured to analyze the textual input and provide an output based on the textual input based on a contextual analysis of the textual input. The NLP models provided by the text analysis service 110 may depend upon the services by the application service 125.

In the example implementation shown in FIG. 1, the application service 125 may be a presentation design application, such as but not limited to Microsoft PowerPoint. The application service 125 may include a design recommendation service that provides suggestions for improving the design and layout of the presentation slides. The application service 125 may be configured to send textual content of a slide or slides to the text analysis service 110 for analysis, and the text analysis service 110 may analyze the textual content of the slide or slides using one or more NLP models. The NLP models may be multilingual models trained according to the techniques provided herein. Thus, the textual content may be one or more languages for which the multilingual NLP models have been trained.

Each of the multilingual NLP models provided by the text analysis service 110 may be trained to provide a specific type of output that may be provided to the application service 125. Some examples of the types of NLP models that the application service may provide include but are not limited to a text-to-image model, a text-to-video model, a text-to-emoji model, a text-to-icon model, and/or other NLP models that may be configured to suggest content elements based on the textual input. The content elements identified by the NLP model or models may be provided to the application service 125 for presentation to the user. The application service 125 may provide a user interface for displaying the suggested content elements and for allowing the user to select suggested content elements to add to a slide or slides to improve the layout and or design of the slides.

Figure 3:
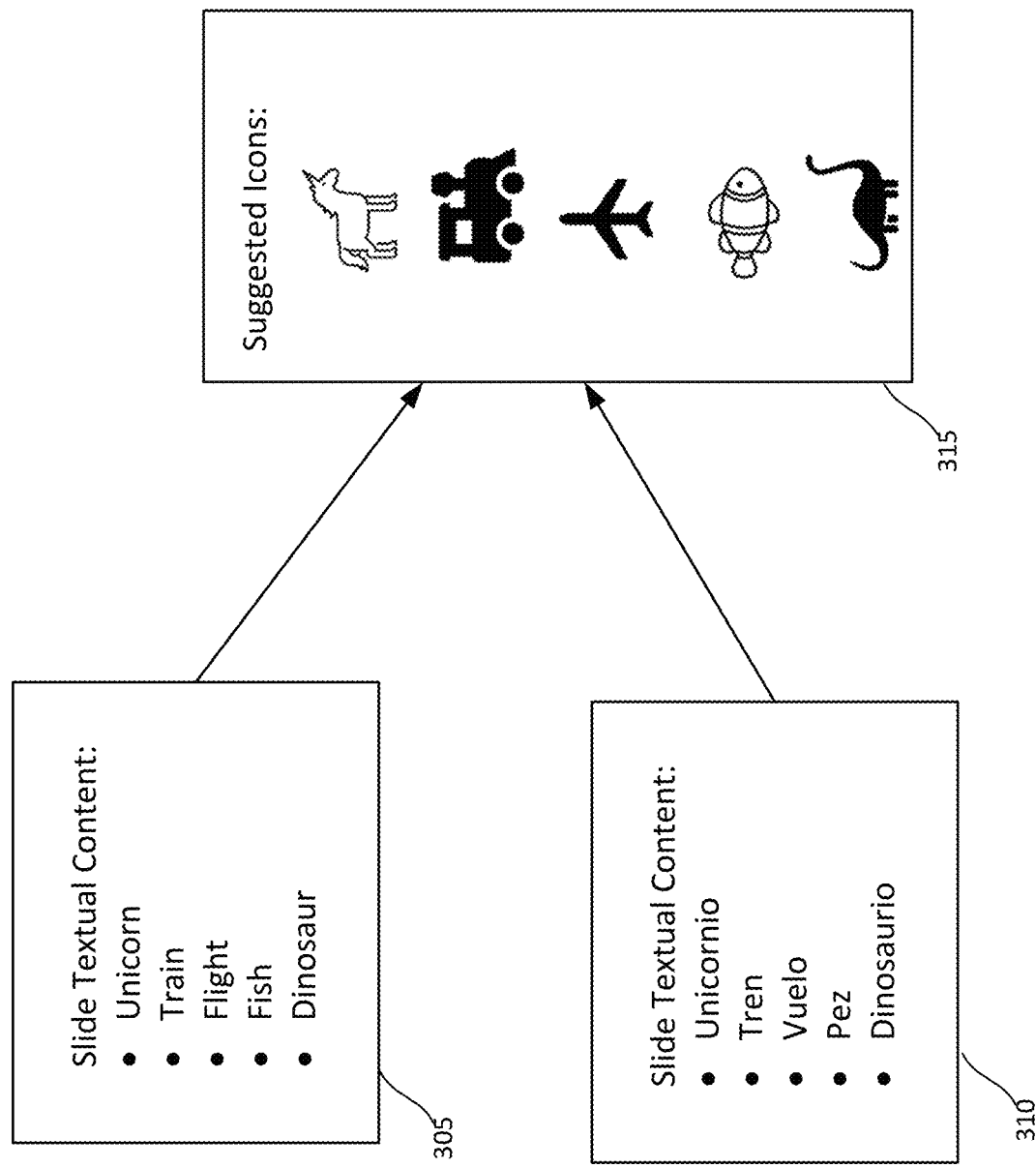
FIG. 3 shows an example of a text-to-icon model being applied to slide contents in two languages.

FIG. 3 shows an example a text-to-icon model being applied to slide contents in two languages. The slide contents 305 are in English and the slide contents 310 are in Spanish. The suggested icons 315 provided by the multilingual text-to-icon model are identical because the model has been trained to recognize both English and Spanish words. The example shown in FIG. 3 is merely to demonstrate the premise of the multilingual models that may be used by the text analysis service 110 and only uses single word inputs. However, the multilingual models trained using the techniques provided herein may be configured to recognize not only words, but also phrases and/or sentences in multiple languages and to provide contextual information that may be used to provide various services to the application provided by the application service 125. These services may include but are not limited to suggesting images, icons, videos, emojis, backgrounds, and/or audio content that may be added to the slide design for the slide designer provided by the application service 125. Other types of NLP models may be implemented that provide other types of outputs based on the interpretation of the textual input received by the text analysis service 110. Furthermore, the application service 125 is not limited to a presentation application that includes a slide designer service. The application service 125 may utilize other types of multilingual NLP models to provided services based on the textual content provided by users in the languages in which the multilingual models have been trained. For example, the text analysis service 110 may include NLP models for performing other services, such as but not limited to answering questions, implementing a conversational agent that may be configured to interact a human user, or document understanding.

The client device 105 is a computing device that may be implemented as a portable electronic device, such as a mobile phone, a tablet computer, a laptop computer, a portable digital assistant device, a portable game console, and/or other such devices. The client device 105 may also be implemented in computing devices having other form factors, such as a desktop computer, vehicle onboard computing system, a kiosk, a point-of-sale system, a video game console, and/or other types of computing devices. While the example implementation illustrated in FIG. 1 includes one client device, other implementations may include multiple client devices.

In the example shown in FIG. 1, the text analysis service 110 is shown as a cloud-based service that may be accessed over a network. However, other implementations of the text analysis service 110 may be achieved by the application service 125 or by the client device 105. For example, the application service 125 may implement an application that is configured to receive textual inputs and to analyze the textual input using the multilingual model provided herein to analyze textual input by a user. In other implementations, the functionality of the text analysis service 110 and/or the application service 125 described herein may be carried out on the client device 105.

Figure 2:
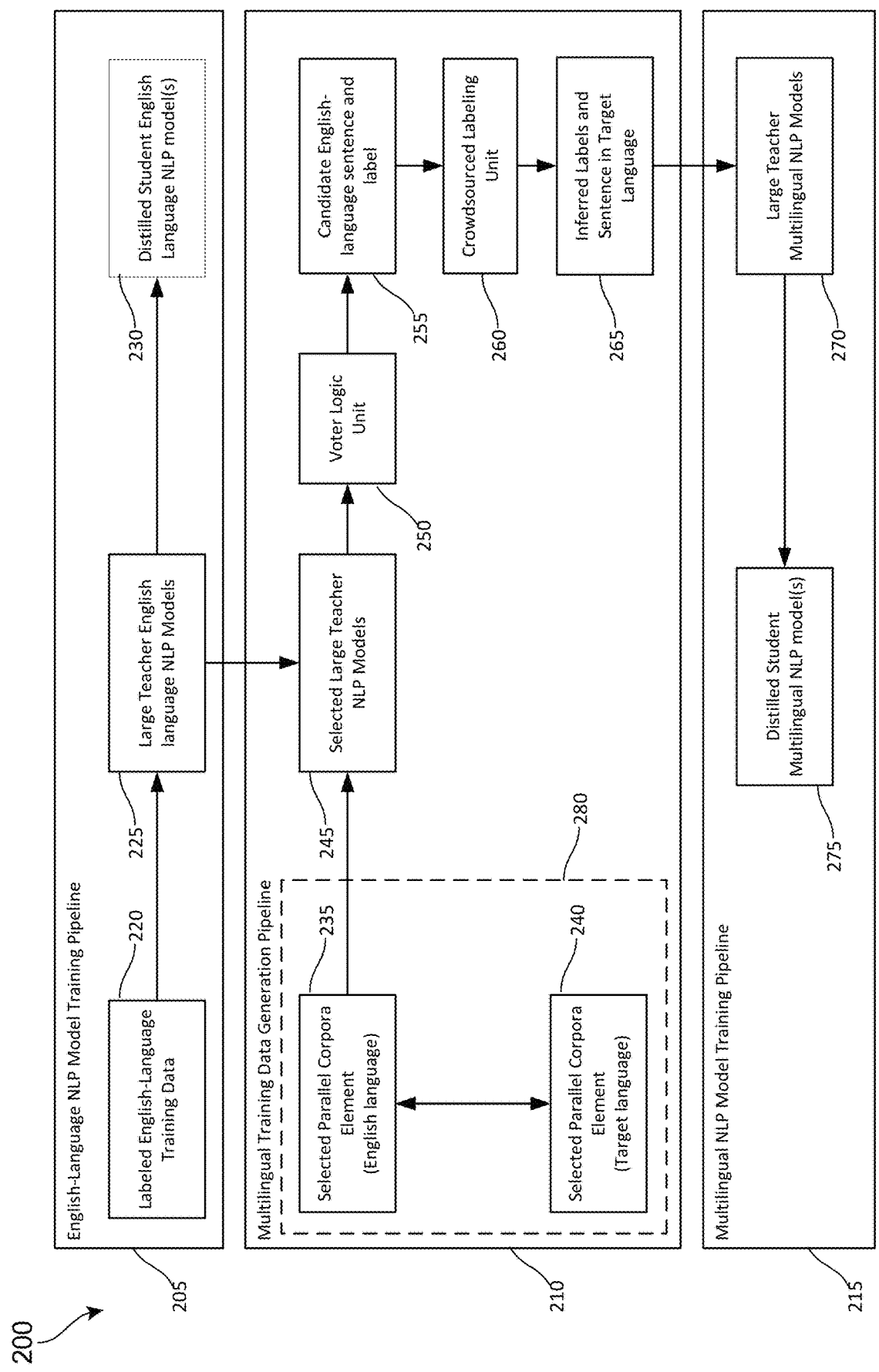
FIG. 2 is an example architecture that may be used, at least in part, to implement the text analysis service shown in FIG. 1.

FIG. 2 is an example architecture 200 that may be used, at least in part, to implement the text analysis service 110. The architecture 200 may include an English-language NLP Model Training Pipeline 205, a multilingual training data generation pipeline 210, and a multilingual NLP model training pipeline 215.

The English-language NLP Model Training Pipeline 205 is configured to train English-language NLP models 225 that may be used to analyze English-language textual inputs. The English-language NLP models 225 may be implemented using various NLP machine learning models. One such model is Bidirectional Encoder Representations from Transformers (BERT) which is a Transformer-based ML technique for NLP. The BERT models have been trained in a large corpora of English language texts. Another such model is ROBERTa, which builds on BERT, to provide NLP analysis. Yet another NLP model that may be used to implement the English-language NLP models 225 is the Turing National Language Generation (T-NLG) model developed by Microsoft.

The English-language NLP models 225 are trained using the Labeled English-Language Training Data 220. The Labeled English-Language Training Data 220 includes labeled English-language training data from English language corpora. The English-language NLP models 225 are trained to provide very accurate analysis of English-language textual inputs. The English-language NLP models 225 are very large models that have a very high knowledge capacity. However, executing these large NLP models is very computationally expensive, and much of the knowledge capacity of the large NLP models may be remain unused.

The distilled student English-language NLP models 230 are one or more machine learning models which may be distilled from the English-language NLP models 225. Knowledge distillation is a process of transferring knowledge from a large ML model to a smaller ML model without a loss of validity. The distilled student English-language NLP models 230 are smaller than the English-language NLP models 225 and may be deployed on less powerful hardware. The distilled student English-language NLP models 230 models may be deployed to the client device 105, for example, which may have significantly less computing capacity than the text analysis service 110 and application service 125.

The English-language NLP Model Training Pipeline 205 may be implemented by a separate service or services than the text analysis service 110, which may provide access to the English-language NLP models 225. The English-language NLP models 225 may be freely available or available for licensing.

The multilingual training data generation pipeline 210 may be implemented by the text analysis service 110, while the English-language NLP Model Training Pipeline 205 may be implemented by a separate service. The multilingual training data generation pipeline 210 may be configured to generate labeled training data that may be used for training multilingual NLP models.

The multilingual training data generation pipeline 210 may use well-established and English-centric multilingual corpora to generate training data for fine tuning multilingual NLP models. The multilingual corpora include human-verified translations of textual content in English and one or more other languages. The corpora may be publicly available corpora or licensed from a third-party provider.

One source of corpora that includes high-quality English and non-English translations of the same textual content is the Linguistic Data Consortium (LDC). Other sources of corpora may be publicly available corpora that are provided by governments, universities, research institutions, and/or other sources of high-quality human-translated content. The corpora may be selected such that the corpora do not introduce a bias into the training data generated by the multilingual training data generation pipeline 210 for training data for multilingual NLP model(s). For example, the European Union publishes numerous government documents in English and in several official languages of the European Union that may be used as a source of textual content which has been translated into multiple languages. However, the documents included in the corpus of European Union documents may include terminology which is very specific to governments in general and/or to the European Union more specifically. Such terminology may not reflect common usage of the languages for which the corpus provides textual content. Thus. NLP models trained using data from such corpora may not provide accurate results when analyzing textual content that includes common usage of the languages represented by the corpora.

The multilingual training data generation pipeline 210 is configured to leverage the highly accurate English-language NLP models 225 provided by the NLP Model Training Pipeline 205 to generate labels for training data for training a multilingual NLP model and/or for refining the training of a large pretrained NLP model. The labels generated based on the English-language textual content may then be used to label the corresponding training data in the other languages provided by the corpus. As a result, the multilingual training data generation pipeline 210 may automatically generate labeled training data in one or more non-English languages for which there may be very little labeled training data available. The examples which follow describe how the multilingual training data generation pipeline 210 may generate such training data.

The multilingual training data generation pipeline 210 may utilize a parallel corpus 280 to generate labeled training data in multiple languages. The parallel corpus includes an English-language translation of content items and one or more associated translations of these content items into one or more other languages. The process of generating the labeled training data may begin with selecting an English language content item, also referred to herein as a selected parallel corpus element 235, from the parallel corpus 280. In some implementations, the selected parallel corpus element 235 may be selected by a human user. In other implementations, the selected parallel corpus element 235 may be automatically selected by the multilingual training data generation pipeline 210. The selected parallel corpus element 235 is associated with a selected parallel corpus element 240) which is in a non-English target language for which the multilingual NLP model is to be trained. As discussed above, the parallel corpus 280 may include multiple parallel translations so that the English-language element has corresponding translations in multiple target languages. In such instances, the labels generated by the multilingual training data generation pipeline 210 may be associated with each of the selected parallel corpus elements 240) associated with the selected parallel corpus element 235 in English. A technical benefit of selecting corpora having multiple target languages is that the label for the training data needs to be determined only one time but multiple target languages are provided.

The multilingual training data generation pipeline 210 may be configured to generate the multilingual training data in two phases: (1) a testing and validation phase, and (2) an automated training data generation phase. During the testing and validation phase, the multilingual training data generation pipeline 210 generates candidate test data based on the English-language content of the parallel corpora 280 and uses human input to validate the labels associated with the test data are correct. The multilingual training data generation pipeline 210 may then enter the automated training data generation phase once the results of the validation phase reach an accuracy threshold.

The multilingual training data generation pipeline 210 begins with the testing and validation phase. During this phase, the selected parallel corpora element 235 consisting of the English-language text is provided to a set of selected large teacher NLP models 245 to generate a set of candidate labels for the selected parallel corpora element 235. The English-language NLP models 245 are selected from the large English NLP models 225 provided by the English-language NLP Model Training Pipeline 205. The large English NLP models 225 are known to provide extremely accurate labeling of English-language textual content. The English-language NLP models 245 each analyze the English-language phrase or sentence to generate a candidate label for the training data.

The candidate labels determined by the selected large teacher NLP models 245 are provided to the voter logic unit 250. The voter logic unit 250 is configured to compare the candidate labels to determine whether a majority of the English-language NLP models 245 agreed upon the labels of the selected parallel corpora element 235 consisting of the English-language text. The English-language NLP models 245 may be fixed, so the candidate labels generated by each model is deterministic. If a majority of the English-language NLP models 245 did not agree upon the context of the selected parallel corpora element 235 consisting of the English-language text, the voter logic unit 250 may be configured to discard the current selected parallel corpora element 235 and a new selected parallel corpora element 235 may be selected from the parallel corpora 280. Otherwise, if a majority of the English-language NLP models 245 agreed on the context of the selected parallel corpora element 235 consisting of the English-language text, then the candidate labels associated with the selected parallel corpora element 235 is likely to be correct, and the voter logic unit 250 outputs a label associated with the English-language sentence or phrase 255 which may be used as training data for the multilingual NLP. The label is selected from the candidate labels determined by the selected large teacher NLP models 245, and the English-language phrase or sentence is the English-language text of the selected parallel corpora element 235.

The candidate English-language phrase or sentence and label may be provided to a crowdsourced labeling unit 260. The crowdsourced labeling unit 260 may be configured to provide the candidate English-language sentence and label to human users to review to provide feedback whether the label accurately represents the English-language phrase or sentence. The human users may provide a "yes" or "no" response that indicates whether the label accurately represents the English-language phrase or sentence. The crowdsourced labeling unit 260 may be configured to send the English-language sentence and label to at least three human users to review the label to determine whether the label accurately represents the English-language phrase or sentence. The crowdsourced labeling unit 260 is described in greater detail with respect to FIG. 4. The crowdsourced labeling unit 260 may be used during the testing and validation phase testing and validation phase to ensure that the voter logic unit 250 is accurately selecting a label for the English-language content.

If, based on the human user feedback, the crowdsourced labeling unit 260 determines that the label is representative of the candidate English-language phrase or sentence, the multilingual training data generation pipeline 210 may generate training data in the target language that includes inferred labels and the sentence in the target language 265. The multilingual training data generation pipeline 210 may create training data in one or more target languages included in the parallel corpora 280. For example, parallel corpora 280 may include one or more selected parallel corpora elements 240 that correspond to the English-language phrase or sentence but are in one of the other languages included in the parallel corpora 280. The multilingual training data generation pipeline 210 may generate training data that is associated with a phrase or sentence that corresponds to the English-language phrase or sentence and label that training data using the label developed based on the English-language phrase or sentence since both the non-English content and the English-language content should have the same meaning.

If, based on the human user feedback, the crowdsourced labeling unit 260 determines that the label is not representative of the candidate English-language phrase or sentence, the multilingual training data generation pipeline 210 may discard the candidate English-language phrase or sentence and label 255. The multilingual training data generation pipeline 210 may then select a new English-language selected parallel corpora element 235 from the parallel corpora 280 and repeat the label-generation process for that selected element.

The multilingual training data generation pipeline 210 may be configured to select a number of English-language parallel corpora elements to be analyzed from the parallel corpora 280. In other implementations, a set of English-language parallel corpora elements may be specified by a user. The multilingual training data generation pipeline 210 may be configured to track of how many of these elements were determined to be labeled correctly by the multilingual training data generation pipeline 210 and how many were determined to have been labeled incorrectly. The multilingual training data generation pipeline 210 may be configured to determine a percentage of the English-language elements that were determined to be labeled correctly and/or a percentage of the English-language elements that were determined to be labeled incorrectly.

The multilingual training data generation pipeline 210 may take one or more remedial actions in response to the portion of English-language elements that were determined to be labeled correctly not exceeding a correct labeling threshold or in response to the portion of English-language elements that were determined to be labeled incorrectly exceeding an incorrect labeling threshold. The remedial measures may include further refining the training of one or more of the selected large teacher NLP models 245 with additional labeled training data. Furthermore, one or more additional NLP models may be added to the selected large teacher NLP models 245, and/or one or more low performing NLP models may be removed from the selected large teacher NLP models 245. The remedial measures may also include selecting data from a portion of a different corpus than the parallel corpora 280 and determining whether the correct labeling rates and/or the incorrect labeling rates are within the acceptable thresholds for the newly selected corpus. The multilingual training data generation pipeline 210 may then initiate the automated training data generation phase using content obtained from the newly selected corpus.

The multilingual training data generation pipeline 210 may initiate the automated training data generation phase in response to the percentage of English-language elements that were determined to be labeled correctly exceeding the correct labeling threshold and/or in response to the percentage of English-language elements that were determined to be labeled incorrectly not exceeding the incorrect labeling threshold.

In the automated training data generation phase, the multilingual training data generation pipeline 210 may automate the process performed in the testing and validation phase to generate the multilingual training data automatically. The testing and validation phase may automatically select English-language corpora elements from the parallel corpora 280 that include one or more corresponding parallel corpora elements 240 in a target language for which the multilingual NLP model is to be trained. Each selected parallel corpora element 235 is analyzed by the selected large teacher NLP models 245 to obtain candidate labels. The voter logic unit 250 then analyzes the candidate labels to determine whether the labels generated by the models are sufficiently consistent. If the candidate labels are not sufficiently consistent, the selected parallel corpora element 235 may be discarded and another English-language content item selected from the parallel corpora 280. Otherwise, if the voter logic unit 250 determines that the candidate labels are sufficiently consistent, the voter logic unit 250 may output a selected candidate English-language sentence and selected label 255. Training data for training a large multilingual NLP may then be generated that includes the selected candidate English-language content item and selected label 255. The multilingual training data generation pipeline 210 may also automatically select content items in one or more other languages that are a translation of the English-language content item in the one or more other languages, and automatically generate training data for the content items in the other languages and the candidate label determined by the voter logic 250.

In the automated training data generation phase, the crowdsourced labeling unit 260 may be optionally omitted, because the performance of the voter logic unit 250 was established to be sufficiently reliable during the testing and validation phase that the labels being generated are generally correct within an acceptable margin of error. Accordingly, the accuracy determination by the crowdsourced labeling unit 260 may be omitted, because the multilingual training data generation pipeline 210 has been shown to be reliably labeling the English-language corpora elements which can in turn be used to reliably label the corresponding non-English corpora elements. Skipping the human-validation of the labels assigned to the English-language corpora elements may save a significant amount of time and may significantly reduce costs associated with generating the multilingual training data because the human users do not need to be paid to validate the labels associated with the English-language phrase or sentence.

The correct labeling threshold and/or the incorrect labeling threshold discussed in the preceding examples may be configurable. The number of selected large teacher NLP models 245 may also be configurable. An administrator may adjust these parameters to increase the number of teacher NLP models selected, to increase correct labeling threshold, and/or decrease the incorrect labeling threshold to provide more reliable candidate labels.

Figure 4:
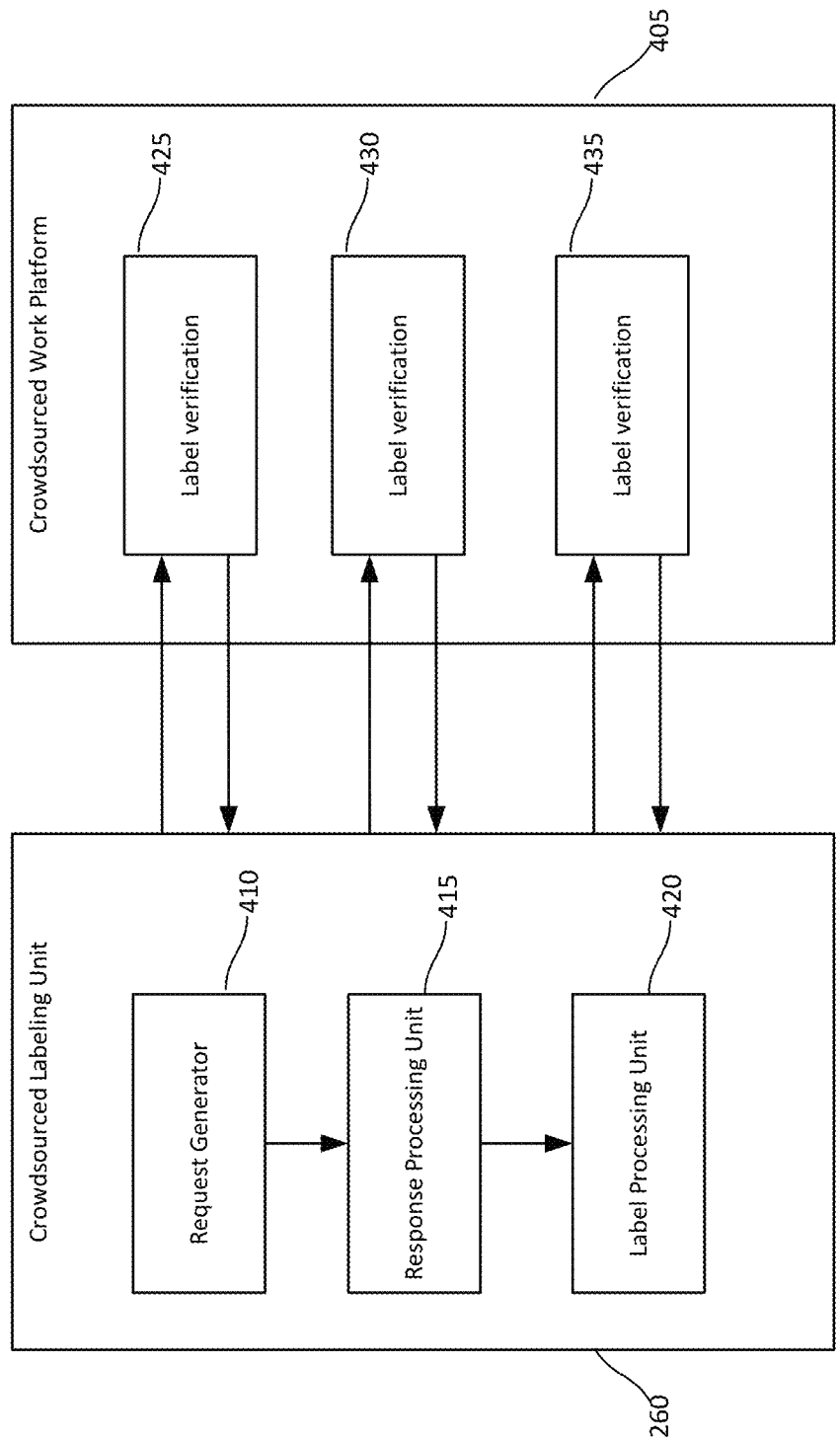
FIG. 4 is a diagram showing an example implementation of the crowdsourced labeling unit shown in FIG. 2.

FIG. 4 is a diagram showing an example implementation of the crowdsourced labeling unit 260. The crowdsourced labeling unit 260 may be configured to communicate with a crowdsourced work platform 405. The crowdsourced work platform 405 is an online service in which work may be outsourced to a distributed workforce. The crowdsourced labeling unit 260 may be configured to use the crowdsourced work platform 405 to connect with human users to review the selected candidate English-language sentence and selected label 255 output by the voter logic unit 250 to determine whether the label accurately represents the candidate English-language sentence. The example implementation shown in FIG. 4 shows the crowdsourced labeling unit 260 sending requests to a single crowdsourced work platform 405. However, the crowdsourced labeling unit 260 may be configured to send requests to more than one crowdsourced work platform 405.

The crowdsourced labeling unit 260 may include a request generator 410 that is configured to generate requests to the crowdsourced work platform 405. The requests may be transmitted from the crowdsourced labeling unit 260 via a network, such as the network 120, to the crowdsourced work platform 405. Each request may include the selected candidate English-language sentence and selected label. The request may ask the human user to provide a yes or no response. The human user provides a "yes" response if the label accurately represents the English-language sentence, and a "no" response if the label does not accurately represent the English-language sentence.

In the example implementation shown in FIG. 4, the crowdsourced labeling unit 260 sends three requests to the crowdsourced work platform 405, and three label verification operations 425, 430, and 435 are performed by human reviewers who review the candidate English-language sentence and selected label and provide a response whether the label accurately represents the English-language sentence. The crowdsourced labeling unit 260 may be configured to send a different number of requests to the crowdsourced work platform 405 in other implementations.

The response processing unit 415 may be configured to receive the responses from the crowdsourced work platform and to tally the responses. The response processing unit 415 may determine whether the responses from the crowdsourced work platform 405 that indicate that the label accurately represents the English-language sentence exceed an accuracy threshold. The accuracy threshold may be a correct labeling threshold associated with a threshold portion of the candidate labels that were correctly labeled, or an incorrect labeling threshold associated with a threshold portion of the candidate labels that were incorrectly labeled, or both.

The label processing unit 420 may be configured to discard the candidate English-language sentence and selected label 255 in response to the response processing unit 415 determining that label accuracy does not exceed the accuracy threshold. The label processing unit 420 may also be configured to trigger the multilingual training data generation pipeline 210 to generate training data in the target language that includes the inferred labels and the sentence in the target language 265 in response to the label processing unit 420 determining that label accuracy exceeds the accuracy threshold.

Figure 5:
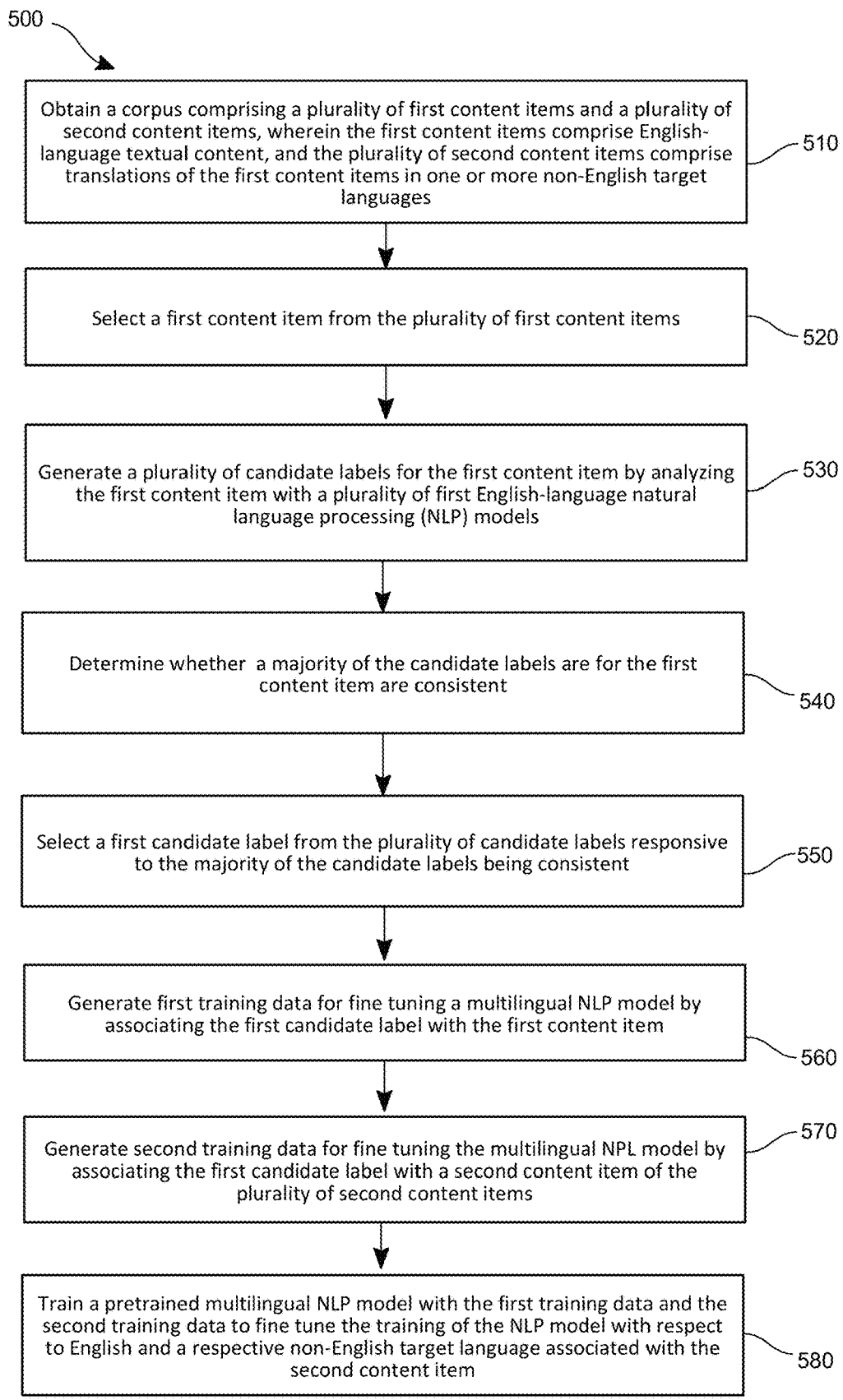
FIG. 5 is flow diagram of a process for generating training data for a multilingual natural language processing model.

FIG. 5 is a flow chart of an example process 500 for generating training data for a multilingual natural language processing model. The process 500 may be implemented by the text analysis service 110 and/or the multilingual training data generation pipeline 210.

The process 500 may include an operation 510 of obtaining a corpus 280 comprising a plurality of first content items and a plurality of second content items. The first content items comprise English-language textual content, and the plurality of second content items comprise translations of the first content items in one or more non-English target languages. As discussed in the preceding examples, a corpus 280 may be obtained that includes English-language textual content and translations of the English-language textual content into one or more non-English target languages. Data may be selected from the corpora 280, labeled, and those labels may be used to generate training data in other languages for training and/or fine tuning a multilingual NLP model.

The process 500 may include an operation 520 of selecting a first content item from the plurality of first content items. The first content item may be a phrase or a sentence of English language textual content, such as the selected parallel corpora element 235 discussed in the preceding examples. The multilingual training data generation pipeline 210 may implement the process for generating training data for multilingual NLP models in two phases: (1) a testing and validation phase, and (2) an automated training data generation phase. The multilingual training data generation pipeline 210 may be configured to automatically select the first content item and any subsequently selected English-language content items from the corpus 280 during the first and second phases. During the testing and validation phase, a user may select the content item and any subsequently selected English-language content items to be processed.

The process 500 may include an operation 530 of generating a plurality of candidate labels for the first content item by analyzing the first content item with a plurality of first English-language natural language processing (NLP) models. The selected content item may be analyzed by a set of selected large teacher NLP models 245. The selected large teacher NLP models 245 are large pretrained NLP models that are configured to provide very accurate labeling of English-language textual inputs. The multilingual training data generation pipeline 210 analyzes the English-language text to generate labels for the training data which can also be used to label training data in other languages that may not have such a robust set of NLP models for analyzing textual content in those languages.

The process 500 may include an operation 540 of determining whether a majority of the candidate labels are for the first content item are consistent. The voter logic unit 250) may compare the candidate labels generated by the selected large teacher NLP models 245 to determine whether the candidate labels are consistent. If the selected large teacher NLP models 245 produced inconsistent results when labeling the first content item, then the labels may be incorrect and the multilingual training data generation pipeline 210 may discard the first content item.

The process 500 may include an operation 550 of selecting a first candidate label from the plurality of candidate labels responsive to the majority of the candidate labels being consistent. The voter logic unit 250 may select one of the candidate labels from the plurality of candidate labels generated by the selected large teacher NLP models 245. In the testing and validation phase, the selected candidate label may be submitted to one or more crowdsourced working platforms by the crowdsourced labeling unit 260 to have human analysts review the selected candidate label and the first content item to determine whether the label accurately represents the first content item.

The process 500 may include an operation 560 of generating first training data for fine tuning a multilingual NLP model by associating the first candidate label with the first content item. The first candidate label is determined by analyzing the first content item using the selected large teacher NLP models 245. The English-language content item may be associated with the label to generated training data for fine tuning the large teacher multilingual NLP models 270 of the multilingual NLP model training pipeline 215.

The process 500 may include an operation 570 of generating second training data for fine tuning the multilingual NLP model by associating the first candidate label with a second content item of the plurality of second content items. A technical benefit of the techniques provided herein is that English-language content from the corpus can be analyzed and the label used to label the non-English translations of the corresponding content.

The process 500 may include an operation 580 of training a pretrained multilingual NLP model with the first training data and the second training data to fine tune the training of the NLP model with respect to English and a respective non-English target language associated with the second content item. The training data generated by the multilingual training data generation pipeline 210 may be provided to the multilingual NLP model training pipeline 215 to fine tune the large teacher multilingual NLP models 270, which may be distilled to generate the distilled student multilingual NLP model(s) 275.

The detailed examples of systems, devices, and techniques described in connection with FIGS. 1-5 are presented herein for illustration of the disclosure and its benefits. Such examples of use should not be construed to be limitations on the logical process embodiments of the disclosure, nor should variations of user interface methods from those described herein be considered outside the scope of the present disclosure. It is understood that references to displaying or presenting an item (such as, but not limited to, presenting an image on a display device, presenting audio via one or more loudspeakers, and/or vibrating a device) include issuing instructions, commands, and/or signals causing, or reasonably expected to cause, a device or system to display or present the item. In some embodiments, various features described in FIGS. 1-5 are implemented in respective modules, which may also be referred to as, and/or include, logic, components, units, and/or mechanisms. Modules may constitute either software modules (for example, code embodied on a machine-readable medium) or hardware modules.

In some examples, a hardware module may be implemented mechanically, electronically, or with any suitable combination thereof. For example, a hardware module may include dedicated circuitry or logic that is configured to perform certain operations. For example, a hardware module may include a special-purpose processor, such as a field-programmable gate array (FPGA) or an Application Specific Integrated Circuit (ASIC). A hardware module may also include programmable logic or circuitry that is temporarily configured by software to perform certain operations and may include a portion of machine-readable medium data and/or instructions for such configuration. For example, a hardware module may include software encompassed within a programmable processor configured to execute a set of software instructions. It will be appreciated that the decision to implement a hardware module mechanically, in dedicated and permanently configured circuitry, or in temporarily configured circuitry (for example, configured by software) may be driven by cost, time, support, and engineering considerations.

Accordingly, the phrase "hardware module" should be understood to encompass a tangible entity capable of performing certain operations and may be configured or arranged in a certain physical manner, be that an entity that is physically constructed, permanently configured (for example, hardwired), and/or temporarily configured (for example, programmed) to operate in a certain manner or to perform certain operations described herein. As used herein, "hardware-implemented module" refers to a hardware module. Considering examples in which hardware modules are temporarily configured (for example, programmed), each of the hardware modules need not be configured or instantiated at any one instance in time. For example, where a hardware module includes a programmable processor configured by software to become a special-purpose processor, the programmable processor may be configured as respectively different special-purpose processors (for example, including different hardware modules) at different times. Software may accordingly configure a processor or processors, for example, to constitute a particular hardware module at one instance of time and to constitute a different hardware module at a different instance of time. A hardware module implemented using one or more processors may be referred to as being "processor implemented" or "computer implemented."

Hardware modules can provide information to, and receive information from, other hardware modules. Accordingly, the described hardware modules may be regarded as being communicatively coupled. Where multiple hardware modules exist contemporaneously, communications may be achieved through signal transmission (for example, over appropriate circuits and buses) between or among two or more of the hardware modules. In embodiments in which multiple hardware modules are configured or instantiated at different times, communications between such hardware modules may be achieved, for example, through the storage and retrieval of information in memory devices to which the multiple hardware modules have access. For example, one hardware module may perform an operation and store the output in a memory device, and another hardware module may then access the memory device to retrieve and process the stored output.

In some examples, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by, and/or among, multiple computers (as examples of machines including processors), with these operations being accessible via a network (for example, the Internet) and/or via one or more software interfaces (for example, an application program interface (API)). The performance of certain of the operations may be distributed among the processors, not only residing within a single machine, but deployed across several machines. Processors or processor-implemented modules may be in a single geographic location (for example, within a home or office environment, or a server farm), or may be distributed across multiple geographic locations.

Figure 6:
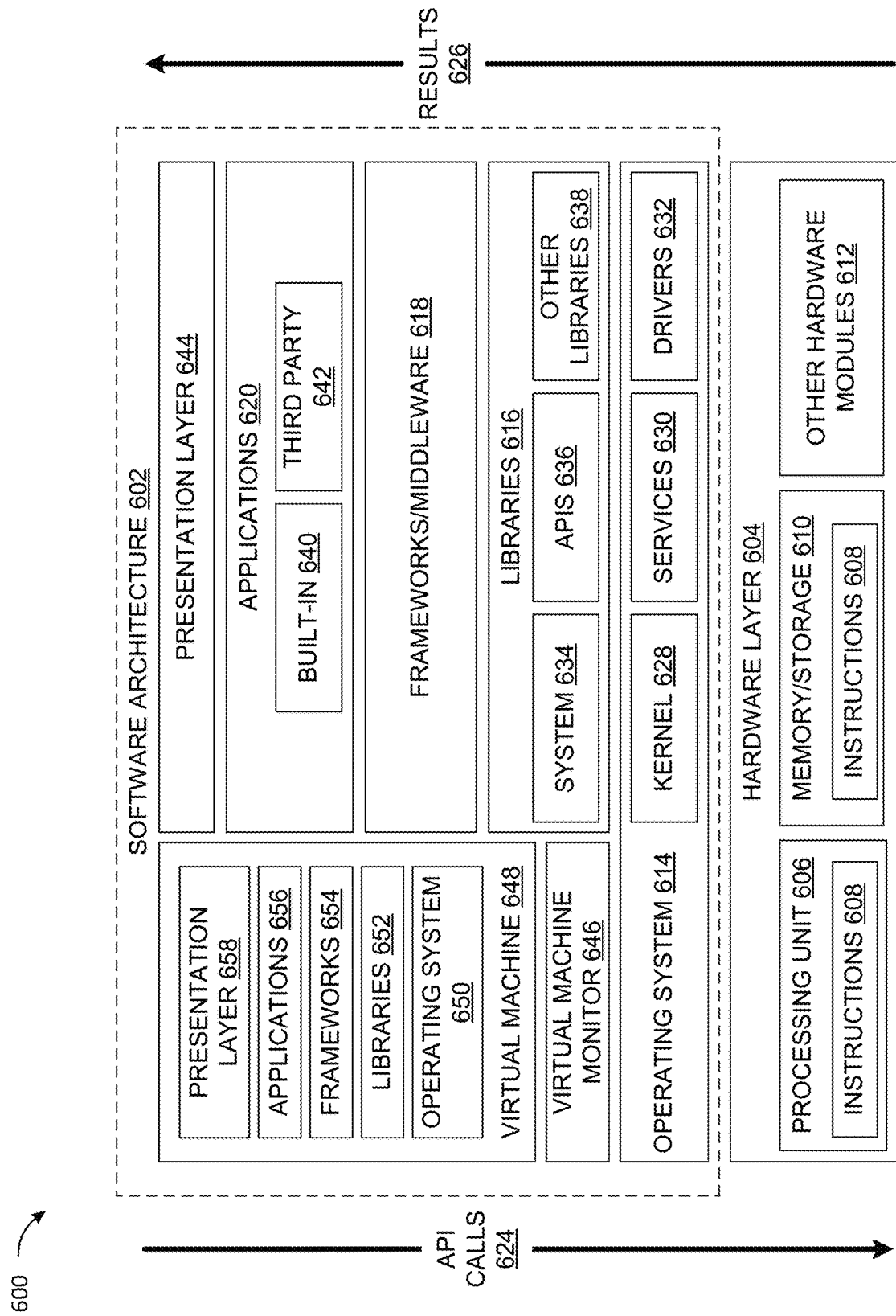
FIG. 6 is a block diagram showing an example software architecture, various portions of which may be used in conjunction with various hardware architectures herein described, which may implement any of the described features.

FIG. 6 is a block diagram 600 illustrating an example software architecture 602, various portions of which may be used in conjunction with various hardware architectures herein described, which may implement any of the above-described features. FIG. 6 is a non-limiting example of a software architecture and it will be appreciated that many other architectures may be implemented to facilitate the functionality described herein. The software architecture 602 may execute on hardware such as a machine 700 of FIG. 7 that includes, among other things, processors 710, memory 730), and input/output (I/O) components 750. A representative hardware layer 604 is illustrated and can represent, for example, the machine 700 of FIG. 7. The representative hardware layer 604 includes a processing unit 606 and associated executable instructions 608. The executable instructions 608 represent executable instructions of the software architecture 602, including implementation of the methods, modules and so forth described herein. The hardware layer 604 also includes a memory/storage 610, which also includes the executable instructions 608 and accompanying data. The hardware layer 604 may also include other hardware modules 612. Instructions 608 held by processing unit 606 may be portions of instructions 608 held by the memory/storage 610.

The example software architecture 602 may be conceptualized as layers, each providing various functionality. For example, the software architecture 602 may include layers and components such as an operating system (OS) 614, libraries 616, frameworks 618, applications 620, and a presentation layer 644. Operationally, the applications 620 and/or other components within the layers may invoke API calls 624 to other layers and receive corresponding results 626. The layers illustrated are representative in nature and other software architectures may include additional or different layers. For example, some mobile or special purpose operating systems may not provide the frameworks/middleware 618.

The OS 614 may manage hardware resources and provide common services. The OS 614 may include, for example, a kernel 628, services 630, and drivers 632. The kernel 628 may act as an abstraction layer between the hardware layer 604 and other software layers. For example, the kernel 628 may be responsible for memory management, processor management (for example, scheduling), component management, networking, security settings, and so on. The services 630 may provide other common services for the other software layers. The drivers 632 may be responsible for controlling or interfacing with the underlying hardware layer 604. For instance, the drivers 632 may include display drivers, camera drivers, memory/storage drivers, peripheral device drivers (for example, via Universal Serial Bus (USB)), network and/or wireless communication drivers, audio drivers, and so forth depending on the hardware and/or software configuration.

The libraries 616 may provide a common infrastructure that may be used by the applications 620 and/or other components and/or layers. The libraries 616 typically provide functionality for use by other software modules to perform tasks, rather than interacting directly with the OS 614. The libraries 616 may include system libraries 634 (for example, C standard library) that may provide functions such as memory allocation, string manipulation, file operations. In addition, the libraries 616 may include API libraries 636 such as media libraries (for example, supporting presentation and manipulation of image, sound, and/or video data formats), graphics libraries (for example, an OpenGL library for rendering 2D and 3D graphics on a display), database libraries (for example, SQLite or other relational database functions), and web libraries (for example, WebKit that may provide web browsing functionality). The libraries 616 may also include a wide variety of other libraries 638 to provide many functions for applications 620 and other software modules.

The frameworks 618 (also sometimes referred to as middleware) provide a higher-level common infrastructure that may be used by the applications 620 and/or other software modules. For example, the frameworks 618 may provide various graphic user interface (GUI) functions, high-level resource management, or high-level location services. The frameworks 618 may provide a broad spectrum of other APIs for applications 620 and/or other software modules.

The applications 620 include built-in applications 640 and/or third-party applications 642. Examples of built-in applications 640 may include, but are not limited to, a contacts application, a browser application, a location application, a media application, a messaging application, and/or a game application. Third-party applications 642 may include any applications developed by an entity other than the vendor of the particular platform. The applications 620 may use functions available via OS 614, libraries 616, frameworks 618, and presentation layer 644 to create user interfaces to interact with users.

Some software architectures use virtual machines, as illustrated by a virtual machine 648. The virtual machine 648 provides an execution environment where applications/modules can execute as if they were executing on a hardware machine (such as the machine 700 of FIG. 7, for example). The virtual machine 648 may be hosted by a host OS (for example, OS 614) or hypervisor, and may have a virtual machine monitor 646 which manages operation of the virtual machine 648 and interoperation with the host operating system. A software architecture, which may be different from software architecture 602 outside of the virtual machine, executes within the virtual machine 648 such as an OS 650, libraries 652, frameworks 654, applications 656, and/or a presentation layer 658.

Figure 7:
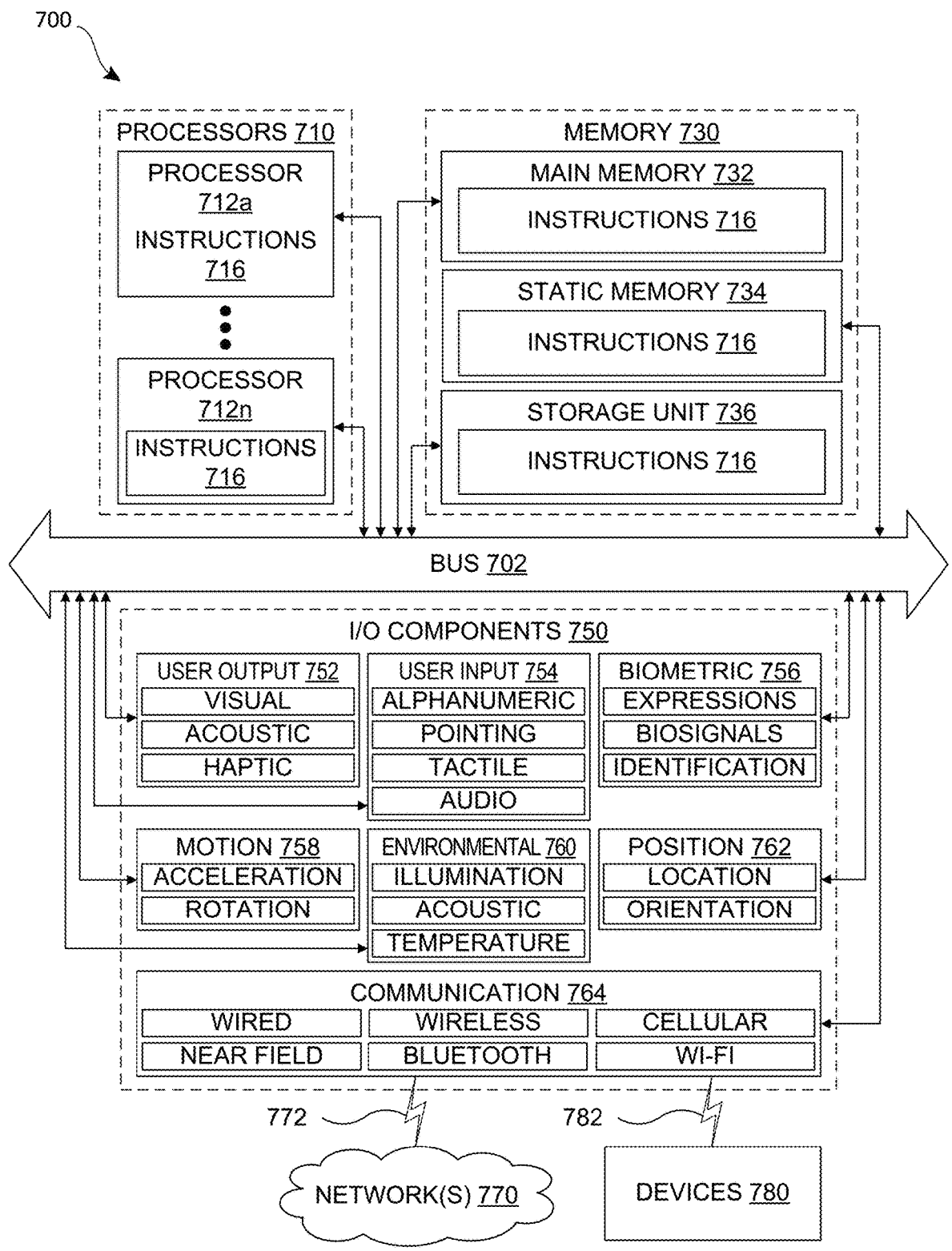
FIG. 7 is a block diagram showing components of an example machine configured to read instructions from a machine-readable medium and perform any of the features described herein.

FIG. 7 is a block diagram illustrating components of an example machine 700 configured to read instructions from a machine-readable medium (for example, a machine-readable storage medium) and perform any of the features described herein. The example machine 700 is in a form of a computer system, within which instructions 716 (for example, in the form of software components) for causing the machine 700 to perform any of the features described herein may be executed. As such, the instructions 716 may be used to implement modules or components described herein. The instructions 716 cause unprogrammed and/or unconfigured machine 700 to operate as a particular machine configured to carry out the described features. The machine 700 may be configured to operate as a standalone device or may be coupled (for example, networked) to other machines. In a networked deployment, the machine 700 may operate in the capacity of a server machine or a client machine in a server-client network environment, or as a node in a peer-to-peer or distributed network environment. Machine 700 may be embodied as, for example, a server computer, a client computer, a personal computer (PC), a tablet computer, a laptop computer, a netbook, a set-top box (STB), a gaming and/or entertainment system, a smart phone, a mobile device, a wearable device (for example, a smart watch), and an Internet of Things (IoT) device. Further, although only a single machine 700 is illustrated, the term "machine" includes a collection of machines that individually or jointly execute the instructions 716.

The machine 700 may include processors 710, memory 730, and I/O components 750, which may be communicatively coupled via, for example, a bus 702. The bus 702 may include multiple buses coupling various elements of machine 700 via various bus technologies and protocols. In an example, the processors 710) (including, for example, a central processing unit (CPU), a graphics processing unit (GPU), a digital signal processor (DSP), an ASIC, or a suitable combination thereof) may include one or more processors 712a to 712n that may execute the instructions 716 and process data. In some examples, one or more processors 710 may execute instructions provided or identified by one or more other processors 710. The term "processor" includes a multi-core processor including cores that may execute instructions contemporaneously. Although FIG. 7 shows multiple processors, the machine 700 may include a single processor with a single core, a single processor with multiple cores (for example, a multi-core processor), multiple processors each with a single core, multiple processors each with multiple cores, or any combination thereof. In some examples, the machine 700 may include multiple processors distributed among multiple machines.

The memory/storage 730) may include a main memory 732, a static memory 734, or other memory, and a storage unit 736, both accessible to the processors 710 such as via the bus 702. The storage unit 736 and memory 732, 734 store instructions 716 embodying any one or more of the functions described herein. The memory/storage 730 may also store temporary, intermediate, and/or long-term data for processors 710. The instructions 716 may also reside, completely or partially, within the memory 732, 734, within the storage unit 736, within at least one of the processors 710 (for example, within a command buffer or cache memory), within memory at least one of I/O components 750, or any suitable combination thereof, during execution thereof. Accordingly, the memory 732, 734, the storage unit 736, memory in processors 710, and memory in I/O components 750 are examples of machine-readable media.

As used herein, "machine-readable medium" refers to a device able to temporarily or permanently store instructions and data that cause machine 700 to operate in a specific fashion, and may include, but is not limited to, random-access memory (RAM), read-only memory (ROM), buffer memory, flash memory, optical storage media, magnetic storage media and devices, cache memory, network-accessible or cloud storage, other types of storage and/or any suitable combination thereof. The term "machine-readable medium" applies to a single medium, or combination of multiple media, used to store instructions (for example, instructions 716) for execution by a machine 700 such that the instructions, when executed by one or more processors 710 of the machine 700, cause the machine 700 to perform and one or more of the features described herein. Accordingly, a "machine-readable medium" may refer to a single storage device, as well as "cloud-based" storage systems or storage networks that include multiple storage apparatus or devices. The term "machine-readable medium" excludes signals per se.

The I/O components 750 may include a wide variety of hardware components adapted to receive input, provide output, produce output, transmit information, exchange information, capture measurements, and so on. The specific I/O components 750 included in a particular machine will depend on the type and/or function of the machine. For example, mobile devices such as mobile phones may include a touch input device, whereas a headless server or IoT device may not include such a touch input device. The particular examples of I/O components illustrated in FIG. 7 are in no way limiting, and other types of components may be included in machine 700. The grouping of I/O components 750 are merely for simplifying this discussion, and the grouping is in no way limiting. In various examples, the I/O components 750 may include user output components 752 and user input components 754. User output components 752 may include, for example, display components for displaying information (for example, a liquid crystal display (LCD) or a projector), acoustic components (for example, speakers), haptic components (for example, a vibratory motor or force-feedback device), and/or other signal generators. User input components 754 may include, for example, alphanumeric input components (for example, a keyboard or a touch screen), pointing components (for example, a mouse device, a touchpad, or another pointing instrument), and/or tactile input components (for example, a physical button or a touch screen that provides location and/or force of touches or touch gestures) configured for receiving various user inputs, such as user commands and/or selections.

In some examples, the I/O components 750 may include biometric components 756, motion components 758, environmental components 760, and/or position components 762, among a wide array of other physical sensor components. The biometric components 756 may include, for example, components to detect body expressions (for example, facial expressions, vocal expressions, hand or body gestures, or eye tracking), measure biosignals (for example, heart rate or brain waves), and identify a person (for example, via voice-, retina-, fingerprint-, and/or facial-based identification). The motion components 758 may include, for example, acceleration sensors (for example, an accelerometer) and rotation sensors (for example, a gyroscope). The environmental components 760 may include, for example, illumination sensors, temperature sensors, humidity sensors, pressure sensors (for example, a barometer), acoustic sensors (for example, a microphone used to detect ambient noise), proximity sensors (for example, infrared sensing of nearby objects), and/or other components that may provide indications, measurements, or signals corresponding to a surrounding physical environment. The position components 762 may include, for example, location sensors (for example, a Global Position System (GPS) receiver), altitude sensors (for example, an air pressure sensor from which altitude may be derived), and/or orientation sensors (for example, magnetometers).

The I/O components 750 may include communication components 764, implementing a wide variety of technologies operable to couple the machine 700 to network(s) 770 and/or device(s) 780 via respective communicative couplings 772 and 782. The communication components 764 may include one or more network interface components or other suitable devices to interface with the network(s) 770. The communication components 764 may include, for example, components adapted to provide wired communication, wireless communication, cellular communication, Near Field Communication (NFC), Bluetooth® communication, Wi-Fi R, and/or communication via other modalities. The device(s) 780 may include other machines or various peripheral devices (for example, coupled via USB).

In some examples, the communication components 764 may detect identifiers or include components adapted to detect identifiers. For example, the communication components 764 may include Radio Frequency Identification (RFID) tag readers, NFC detectors, optical sensors (for example, one- or multi-dimensional bar codes, or other optical codes), and/or acoustic detectors (for example, microphones to identify tagged audio signals). In some examples, location information may be determined based on information from the communication components 762, such as, but not limited to, geo-location via Internet Protocol (IP) address, location via Wi-Fi, cellular, NFC, Bluetooth, or other wireless station identification and/or signal triangulation.

While various embodiments have been described, the description is intended to be exemplary, rather than limiting, and it is understood that many more embodiments and implementations are possible that are within the scope of the embodiments. Although many possible combinations of features are shown in the accompanying figures and discussed in this detailed description, many other combinations of the disclosed features are possible. Any feature of any embodiment may be used in combination with or substituted for any other feature or element in any other embodiment unless specifically restricted. Therefore, it will be understood that any of the features shown and/or discussed in the present disclosure may be implemented together in any suitable combination. Accordingly, the embodiments are not to be restricted except in light of the attached claims and their equivalents. Also, various modifications and changes may be made within the scope of the attached claims.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising." or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that the claims require more features than are expressly recited in each claim. Rather, as the following claims reflect, inventive subject matter lies in less than all features of a single disclosed example. Thus, the following claims are hereby incorporated into the Detailed Description, with each claim standing on its own as a separately claimed subject matter.

What is claimed is:

1. A data processing system comprising:
a processor; and
a machine-readable medium storing executable instructions that, when executed, cause the processor to perform operations comprising:
obtaining a corpus comprising a plurality of first content items and a plurality of second content items, wherein the plurality of first content items comprise English-language textual content, and the plurality of second content items comprise translations of the first content items in one or more non-English target languages; and repeatedly
selecting a first content item from the plurality of first content items;
generating a plurality of candidate labels for the first content item by analyzing the first content item with a plurality of first natural language processing (NLP) models, the plurality of first NLP models including only English-language NLP models trained to analyze an English-language input and to generate a candidate label output;
determining whether a majority of the first NLP models agree that one or more first candidate labels among the plurality of the candidate labels generated by the first NLP models represent context of the first content item consisting of the English-language textual content;
upon determining the majority of the first NLP models agree that the one or more first candidate labels represent context of the first content item consisting of the English-language textual content, sending the one or more first candidate labels and the first content item to a crowdsourced work platform for label verification by a plurality of reviewers to receive an indication that the one or more first candidate labels accurately represent the first content item, responsive to a threshold number of reviewers determining that the one or more first candidate labels accurately represent the first content item; and determining a percentage of English-language elements that were determined to be labeled correctly via the label verification;

when determining the percentage of the English-language elements does not satisfy a correct labeling threshold, performing at least one of removing one or more low performing first NLP models, adding one or more additional first NLP models, or selecting data from a different corpus from the plurality of first content items and the plurality of second content items;

when determining the percentage of the English-language elements satisfies the correct labeling threshold, (1) setting a set of the one or more first candidate labels with the first content item passed via the label verification as test data for testing a pretrained multilingual NLP model, and (2) generating first training data for fine tuning the pretrained multilingual NLP model by repeatedly:

selecting another first content item from the plurality of first content items or the different corpus;

generating a plurality of candidate labels for the other first content item by analyzing the other first content item with the plurality of first NLP models;

determining whether a majority of the first NLP models agree that one or more other first candidate labels among the plurality of the candidate labels generated by the first NLP models for the other first content item represent context of the other first content item consisting of the English-language textual content; and upon determining the majority of the first NLP models agree that the one or more other first candidate labels represent context of the first content item consisting of the English-language textual content, setting the one or more other first candidate labels with the other first content item in the first training data;

generating second training data for fine tuning the pretrained multilingual NLP model by associating the one or more other first candidate labels with a second content item of the plurality of second content items; and training the pretrained multilingual NLP model with the first training data and the second training data to fine tune training of the pretrained multilingual NLP model with respect to English and a respective non-English target language associated with the second content item.

2. The data processing system of claim 1, wherein the machine-readable medium includes instructions configured to cause the processor to perform operations of:

when the majority of the first NLP models are not determined as agreed, discarding the first content item and selecting another first content item from the first content items to replace the first content item for generating the first training data and the second training data.

3. The data processing system of claim 1, wherein the machine-readable medium includes instructions configured to cause the processor to perform operations of:

generating a set of third training data by generating a respective training data for each respective content item of the plurality of second content items other than the second content item by associating the respective content item with the one or more first candidate labels; and training the pretrained multilingual NLP model with the set of third training data to further fine tune the training of the NLP model with respect to each non-English target language associated with the second content item.

4. The data processing system of claim 1, wherein the machine-readable medium includes instructions configured to cause the processor to perform operations of:

automatically generating a plurality of candidate labels for each respective content item of the plurality of first content items other than the first content item;

automatically generating a plurality of second candidate labels for each respective content item of the plurality of first content items other than the first content item;

automatically selecting a second candidate label from the plurality of candidate labels for each respective content item of the plurality of first content items other than the first content item;

generating third training data for fine tuning the pretrained multilingual NLP model by associating the second candidate label with each respective content item of the plurality of first content items other than the first content item; and generating fourth training data for fine tuning the pretrained multilingual NLP model by associating the second candidate label with a fourth content item of the plurality of second content items, the fourth content item being a translation of the respective content item of the plurality of first content items other than the first content item.

5. The data processing system of claim 4, wherein the machine-readable medium includes instructions configured to cause the processor to perform operations of:

training the pretrained multilingual NLP model with the third training data and the fourth training data.

6. The data processing system of claim 1, wherein the machine-readable medium includes instructions configured to cause the processor to perform operations of:

distilling a second pretrained multilingual NLP model from the pretrained multilingual NLP model; and installing the second pretrained multilingual NLP model on at least one client device.

7. The data processing system of claim 1, wherein the machine-readable medium includes instructions configured to cause the processor to perform operations of:

testing the pretrained multilingual NLP model with the test data.

8. A method implemented in a data processing system comprising:

obtaining a corpus comprising a plurality of first content items and a plurality of second content items, wherein the plurality of first content items comprise English-language textual content, and the plurality of second content items comprise translations of the first content items in one or more non-English target languages; and repeatedly:

selecting a first content item from the plurality of first content items;

generating a plurality of candidate labels for the first content item by analyzing the first content item with a plurality of first natural language processing (NLP)

models, the plurality of first NLP models including only English-language NLP models trained to analyze an English-language input and to generate a candidate label output;

determining whether the majority of the first NLP models agree that one or more first candidate labels among a plurality of the candidate labels generated by the first NLP models represent context of the first content item consisting of the English-language textual content;

upon determining the majority of the first NLP models agree that the one or more first candidate labels represent context of the first content item consisting of the English-language textual content, sending the one or more first candidate labels and the first content item to a crowdsourced work platform for label verification by a plurality of reviewers to receive an indication that the one or more first candidate labels accurately represent the first content item, responsive to a threshold number of reviewers determining that the one or more first candidate labels accurately represent the first content item; and determining a percentage of English-language elements that were determined to be labeled correctly via the label verification;

when determining the percentage of the English-language elements does not satisfy a correct labeling threshold, performing at least one of removing one or more low performing first NLP models, adding one or more additional first NLP models, or selecting data from a different corpus from the plurality of first content items and the plurality of second content items;

when determining the percentage of the English-language elements satisfies the correct labeling threshold, (1) setting a set of the one or more first candidate labels with the first content item passed via the label verification as test data for testing a pretrained multilingual NLP model, and (2) generating first training data for fine tuning the pretrained multilingual NLP model by repeatedly:

selecting another first content item from the plurality of first content items or the different corpus;

generating a plurality of candidate labels for the other first content item by analyzing the other first content item with the plurality of first NLP models;

determining whether a majority of the first NLP models agree that one or more other first candidate labels among the plurality of the candidate labels generated by the first NLP models for the other first content item represent context of the other first content item consisting of the English-language textual content; and upon determining the majority of the first NLP models agree that the one or more other first candidate labels represent context of the first content item consisting of the English-language textual content, setting the one or more other first candidate labels with the other first content item in the first training data;

generating second training data for fine tuning the pretrained multilingual NLP model by associating the one or more other first candidate labels with a second content item of the plurality of second content items; and training the pretrained multilingual NLP model with the first training data and the second training data to fine tune training of the pretrained multilingual NLP model with respect to English and a respective non-English target language associated with the second content item.

9. The method of claim 8, further comprising:
when the majority of the first NLP models are not determined as agreed, discarding the first content item and selecting another first content item from the first content items to replace the first content item for generating the first training data and the second training data.

10. The method of claim 8, further comprising:
generating a set of third training data by generating a respective training data for each respective content item of the plurality of second content items other than the second content item by associating the respective content item with the one or more first candidate labels; and training the pretrained multilingual NLP model with the set of third training data to further fine tune training of the NLP model with respect to each non-English target language associated with the second content item.

11. The method of claim 8, further comprising:
automatically generating a plurality of candidate labels for each respective content item of the plurality of first content items other than the first content item;

automatically generating a plurality of second candidate labels for each respective content item of the plurality of first content items other than the first content item;

automatically selecting a second candidate label from the plurality of candidate labels for each respective content item of the plurality of first content items other than the first content item;

generating third training data for fine tuning the pretrained multilingual NLP model by associating the second candidate label with each respective content item of the plurality of first content items other than the first content item; and generating fourth training data for fine tuning the pretrained multilingual NLP model by associating the second candidate label with a fourth content item of the plurality of second content items, the fourth content item being a translation of the respective content item of the plurality of first content items other than the first content item.

12. The method of claim 11, further comprising:
training the pretrained multilingual NLP model with the third training data and the fourth training data.

13. The method of claim 8, further comprising:
distilling a second pretrained multilingual NLP model from the pretrained multilingual model; and
installing the second pretrained multilingual NLP model on at least one client device.

14. The method of claim 8, further comprising:
testing the pretrained multilingual NLP model with the test data.

15. A non-transitory machine-readable medium on which are stored instructions that, when executed, cause a processor of a programmable device to perform functions of:
obtaining a corpus comprising a plurality of first content items and a plurality of second content items, wherein the plurality of first content items comprise English-language textual content, and the plurality of second content items comprise translations of the first content items in one or more non-English target languages; and
repeatedly:
selecting a first content item from the plurality of first content items;
generating a plurality of candidate labels for the first content item by analyzing the first content item with a plurality of first natural language processing (NLP) models, the plurality of first NLP models including only English-language NLP models trained to analyze an English-language input and to generate a candidate label output;
determining whether a majority of the first NLP models agree that one or more first candidate labels among the plurality of the candidate labels generated by the first NLP models represent context of the first content item consisting of the English-language textual content;
upon determining the majority of the first NLP models agree that the one or more first candidate labels represent context of the first content item consisting of the English-language textual content, sending the one or more first candidate labels and the first content item to a crowdsourced work platform for label verification by a plurality of reviewers to receive an indication that the one or more first candidate labels accurately represent the first content item, responsive to a threshold number of reviewers determining that the one or more first candidate labels accurately represent the first content item; and
determining a percentage of English-language elements that were determined to be labeled correctly via the label verification;
when determining the percentage of the English-language elements does not satisfy a correct labeling threshold, performing at least one of removing one or more low performing first NLP models, adding one or more additional first NLP models, or selecting data from a different corpus from the plurality of first content items and the plurality of second content items;
when determining the percentage of the English-language elements satisfies the correct labeling threshold,
(1) setting a set of the one or more first candidate labels with the first content item passed via the label verification as test data for testing a pretrained multilingual NLP model, and
(2) generating first training data for fine tuning the pretrained multilingual NLP model by repeatedly:
selecting another first content item from the plurality of first content items or the different corpus;
generating a plurality of candidate labels for the other first content item by analyzing the other first content item with the plurality of first NLP models;
determining whether a majority of the first NLP models agree that one or more other first candidate labels among the plurality of the candidate labels generated by the first NLP models for the other first content item represent context of the other first content item consisting of the English-language textual content; and
upon determining the majority of the first NLP models agree that the one or more other first candidate labels represent context of the first content item consisting of the English-language textual content, setting the one or more other first candidate labels with the other first content item in the first training data;
generating second training data for fine tuning the pretrained multilingual NLP model by associating the one or more other first candidate labels with a second content item of the plurality of second content items; and
training the pretrained multilingual NLP model with the first training data and the second training data to fine tune training of the pretrained multilingual NLP model with respect to English and a respective non-English target language associated with the second content item.

16. The non-transitory machine-readable medium of claim 15, further comprising:
when the majority of the first NLP models are not determined as agreed, discarding the first content item and selecting another first content item from the first content items to replace the first content item for generating the first training data and the second training data.

17. The non-transitory machine-readable medium of claim 15, further comprising:
generating a set of third training data by generating a respective training data for each respective content item of the plurality of second content items other than the second content item by associating the respective content item with the one or more first candidate labels; and
training the pretrained multilingual NLP model with the set of third training data to further fine tune the training of the NLP model with respective to each non-English target language associated with the second content item.

18. The non-transitory machine-readable medium of claim 15, further comprising:
automatically generating a plurality of candidate labels for each respective content item of the plurality of first content items other than the first content item;
automatically generating a plurality of second candidate labels for each respective content item of the plurality of first content items other than the first content item;
automatically selecting a second candidate label from the plurality of candidate labels for each respective content item of the plurality of first content items other than the first content item;
generating third training data for fine tuning the pretrained multilingual NLP model by associating the second candidate label with each respective content item of the plurality of first content items other than the first content item; and
generating fourth training data for fine tuning the pretrained multilingual NLP model by associating the second candidate label with a fourth content item of the plurality of second content items, the fourth content item being a translation of the respective content item of the plurality of first content items other than the first content item.

19. The non-transitory machine-readable medium of claim 15, further comprising:
distilling a second pretrained multilingual NLP model from the pretrained multilingual model; and
installing the second pretrained multilingual NLP model on at least one client device.

20. The non-transitory machine-readable medium of claim 15, further comprising:

testing the pretrained multilingual NLP model with the test data.

* * * * *